United States Patent [19]

Ishida

[11] Patent Number: 4,516,219

[45] Date of Patent: May 7, 1985

[54] ADDRESS DESIGNATING METHOD OF MEMORY AND APPARATUS THEREFOR

[75] Inventor: Masayuki Ishida, Nagaokakyo, Japan

[73] Assignee: Mitsubishi Denki Kabushiki Kaisha, Tokyo, Japan

[21] Appl. No.: 446,403

[22] Filed: Dec. 2, 1982

[30] Foreign Application Priority Data

Dec. 18, 1981 [JP] Japan .............................. 56-205766
Jun. 21, 1982 [JP] Japan ................................ 57-10807

[51] Int. Cl.³ ............................................. G06F 9/32
[52] U.S. Cl. ................................................... 364/900
[58] Field of Search ... 364/200 MS File, 900 MS File; 371/13, 38

[56] References Cited

U.S. PATENT DOCUMENTS

| | | | |
|---|---|---|---|
| 4,048,624 | 9/1977 | Cochran et al. | 364/900 |
| 4,077,058 | 2/1978 | Appeal et al. | 364/200 |
| 4,328,543 | 5/1982 | Brickman et al. | 364/200 |
| 4,387,424 | 6/1983 | Frediami et al. | 364/200 |
| 4,398,264 | 8/1983 | Couper et al. | 364/200 |

Primary Examiner—Raulfe B. Zache
Assistant Examiner—David Y. Eng
Attorney, Agent, or Firm—Lowe, King, Price & Becker

[57] ABSTRACT

An address designating method of a memory is performed by dividing the addresses of the memory to row addresses and column addresses. The writing of data in the memory is performed by the following steps. Namely, while the row addressing is maintained in a predetermined value (for example, 7d+1), the column addressing is incremented one by one. When the column addressing reaches 3, the row addressing is decremented by 4d+1. Each time the row addressing is decremented by d, the column addressing is decremented one by one in accord therewith. The reading of the data from the memory is performed by the following steps. Namely, each time the row addressing is incremented by d, the column addressing is also incremented one by one in accord therewith. When the column addressing reaches 3, the row addressing is decremented by 3d+1. With the row addressing kept in 0, the column addressing is decremented one by one.

18 Claims, 22 Drawing Figures

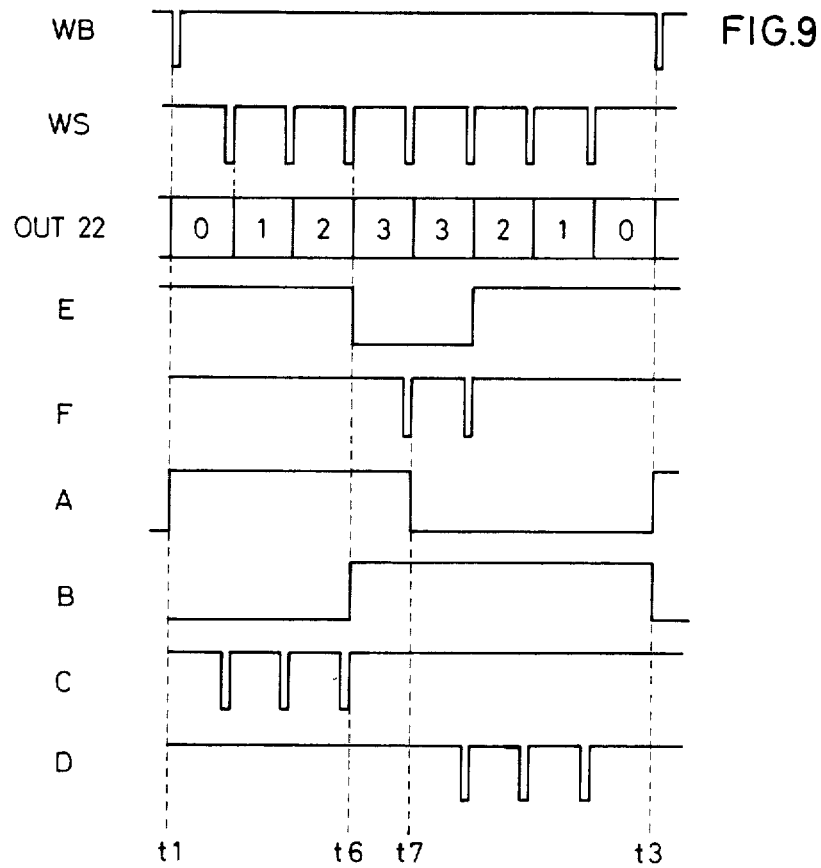
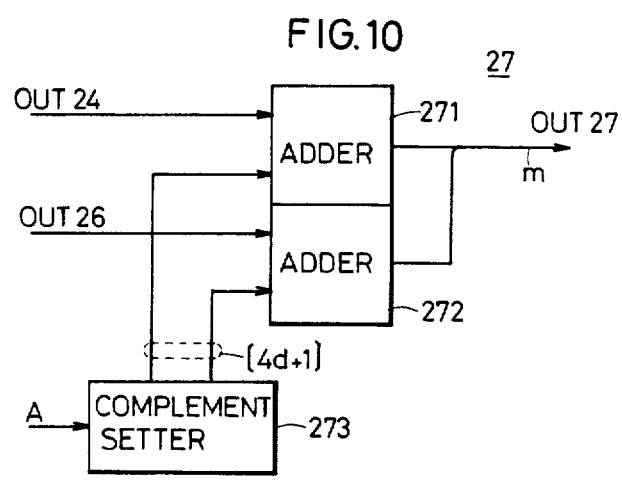

ADDRESS DESIGNATING METHOD OF MEMORY AND APPARATUS THEREFOR

BACKGROUND OF THE INVENTION

1. Field of the Invention

The present invention relates to an address designating method of a memory and an apparatus therefor. More specifically, the present invention relates to an address designating method of a memory for use in interleaving or deinterleaving the data using a memory on a block unit basis and an apparatus for performing the same.

2. Description of the Prior Art

Of late, an error correcting code has been employed to obtain a reproduced sound of a high quality in a PCM recorder, a PCM audio disc, and the like. Such an error correcting system using an error correcting code is performed by secting a word series of sampled signals obtained by sampling an analogue signal into a plurality of words or a plurality of blocks of frame, by implementing one error correcting block by adding an error correcting word to each block, and by making correction on the occasion of reproduction with respect to an erroneous word on a transmission line. However, there is a limit to such error correcting system and it becomes impossible to make correction when almost all words in one error correcting block are in error due to occurrence of a burst error on a transmission line.

Conventionally, as a countermeasure to a burst error, error correction was made by interleaving in which the respective words in the error correcting block are dispersed on the occasion of recording, by recording the respective words at given intervals on a recording medium, and by deinterleaving for restoring the same to the original arrangement on the occasion of reproduction.

FIG. 1 is a diagram showing a data format for explaining the processing for interleaving and deinterleaving which constitutes the background of the present invention. Referring to the figure, one error correcting block is shown, in which one frame is assumed to be one block and one block comprises eight words of D0 to D7. In such a case, group 1 shows the N-th error correcting block including eight words of D0 to D7, wherein an error correcting code is added to a sampled signal word, where N is an integer. For example, the words D0 to D5 constitute the data and the words D6 and D7 constitute an error correcting code. Group 2 shows a delay amount of the respective words D0, D1, D2 to D7 in one block and the same is determined as 0, d, 2d to 7d, where d denotes a unit delay amount of the integer and is selected to be a data transmission time of one word, for example. In the following description, d=16 is assumed by way of one example. In interleaving, the respective words D0 to D7 in one block are delayed by a delay amount corresponding to the respective words. Group 3 shows a word structure of one block after interleaving. After processing of interleaving, each block is constituted with the words which were in the error correcting block of a different number and the same is recorded on a recording medium such as a record disc. Group 4 shows a delay amount per each word in the case where the data as interleaved as described previously is to be deinterleaved. The delay amount on the occasion of the deinterleaving is selected to be a value which is reverse proportional to the delay amount on the occasion of interleaving. For example, in the case where the delay amount on the occasion of interleaving is selected to be 0, d to 7d for the words D0, D1 to D7, respectively, the delay amount on the occasion of deinterleaving is selected to be 7d, 6d to 0, respectively. Group 5 shows a format of one error correcting block after the processing of deinterleaving was performed. As is clear from the illustration, the respective words D0 to D7 all become equal to the words of the (N−7d)-th error correcting block and this means that a combination before interleaving was regained, except for the point of the delay amount 7d.

If and when the processing of interleaving and the processing of deinterleaving as shown in FIG. 1 are performed, even if a burst error occurs on a transmission line and an error of the length of eight words of the block shown by group 3 has occurred, erroneous words are dispersed by performing the processing of deinterleaving and therefore an error of only one word is merely caused in one block obtained by the processing of deinterleaving, whereby correction can be made. In order to achieve the processing of such interleaving and deinterleaving, an approach is employed in which the word data of one block is once stored in a memory and thereafter the respective words are read out in a predetermined sequence. In the following, an addressing control of the memory on the occasion of performing the interleaving and the deinterleaving will be described.

First, a description will be made of a case where the deinterleaving is performed. FIG. 2 is a block diagram of a conventional address designating apparatus of a memory in the case where the processing of deinterleaving is to be performed. Referring to the figure, an address designating apparatus 10 comprises a write address designating circuit 101 and a read address designating circuit 102. Now a specific structure of the address designating apparatus 10 will be described. A write sample clock WS (hereinafter referred to as a clock WS) is applied to an input terminal 11a. The clock WS is applied to an addition input terminal UP of a counter 12. The counter 12 has a three-bit output and makes an addition operation upon each receipt of the clock WS, whereby a count value thereof is withdrawn as write addressing data corresponding to the words in one block. A write block change clock WB (hereinafter referred to as a clock WB) is applied to an input terminal 11b. The clock WB is applied to a reset input terminal R of a counter 12 and is also applied to an addition input terminal UP of a counter 13. The write addressing of a memory 40 is determined by the output from these counters 12 and 13. More specifically, the output from the counter 12 is applied to a selector 14 as write address data for designating the three less significant bits of the memory 40. The output from the counter 13 is applied to the selector 14 as write address data designating the more significant address of the memory 40.

A read sample clock RS (hereinafter referred to as a clock RS) is applied to an input terminal 11c. The clock RS corresponds to eight words in one error correcting block. The clock RS is applied to both the addition input terminal UP of the counter 15 and the addition input terminal UP of the counter 16. The counter 15 has a three-bit output and makes an addition operation upon each application of the clock RS and is reset responsive to the clock RB applied to the input terminal 11d. The clock RB serves as a read block changing clock and is applied one by one as the number of the error correcting block proceeds. The clock RB is applied to the addition input terminal UP of the counter 17. The counter 17 has a four-bit output and provides a carry output from the carry output terminal CA to the addition input terminal UP of a counter 18. The counter 18 provides the count value to the parallel load input of the counter 16. The counter 16 is supplied with the load clock LD being applied to the input terminal 11e. The read address of the memory 40 is determined as a function of the outputs from these counters 15 to 17. More specifically, the output of the counter 15 is obtained as read address data designating the address of the less significant three bits. The outputs from the counters 16 and 17 are obtained as read address data designating the more significant address of the memory. The read address data is applied to the selector 14.

The selector 14 serves to selectively provide the write addresses or the read addresses in response to the select signal SL applied to the input terminal 11f. The write address data or the read address data selected by the selector 14 is obtained from the output terminal 11g as the address data of the memory and is applied to the memory 40.

An initial setting circuit 19 is supplied with the outputs from the counters 17 and 18. The initial setting circuit 19 provides an output for setting the count value of the counter 13 to be 7d when the value determined by the output of the counters 17 and 18 is 0.

Before entering into a detailed description of the operation of the address designating apparatus shown in FIG. 2, an outline of the operation will be described with reference to FIG. 3, which is a diagrammatic view of a memory map per one bit in one word on the occasion of deinterleaving. A more significant address value has been selected as row addresses and an address value of the less significant three bits has been selected as column addresses. A triangle mark denotes the write data and a circle mark denotes the read data. The writing of the data is performed by maintaining the row addressing in a predetermined value and by changing one by one the column addressing from 0 to 7. The same is performed by renewing the row addressing one by one. The figure shows a case where the data (D0, N), (D1, N−d), (D2, N−2d), (D3, N−3d), (D4, N−4d), (D5, N−5d), (D6, N−6d) and (D7, N−7d) are written in succession in the row address 7d and the column addresses 0 to 7. The reading of the data is performed by changing one by one the column addressing from 0 to 7 each time d is added to the row addressing obtained by subtracting 7d from the row addressing on the occasion of the writing. The same is performed by renewing one by one the row addressing. The figure shows a case where the data (D0, N−7d), (D1, N−7d), (D2, N−7d), (D3, N−7d), (D4, N−7d), (D5, N−7d), (D6, N−7d) and (D7, N−7d) of the addresses (0, 1), (d, 1), (2d, 2), (3d, 3), (4d, 4), (5d, 5), (6d, 6) and (7d, 7) are in succession read out. The data as read out are those deinterleaved.

Now the operation of the address designating apparatus shown in FIG. 2 will be described in detail with reference to FIGS. 3 to 5. FIG. 4 is a time chart for explaining the operation of the write address designating circuit 101 and FIG. 5 is a time chart for explaining of the operation of the read address designating circuit 102.

First, the operation of the write address designating circuit 101 will be described mainly with reference to the FIG. 4 time chart. The example shown in the figure shows a case where the eight words in one transmission block (the group 3 shown in FIG. 1) are written by maintaining the more significant address to be constant and by changing the less significant address from 0 to 7 and the next block is written after the more significant address is advanced by one by the clock WB.

At the timing t1 the counter 12 is reset by the clock WB and at the same time one is added to the counter 13. Therefore, the output OUT12 from the counter 12 becomes 0 and at the same time the output OUT13 of the counter 13 is changed from the value assumed immediately before, say 7d−1 to the new value 7d.

At the timing t2 the count value of the counter 12 is advanced by one upon application of the clock WS, thereby to provide 1. At that time, the data of the leading word (D0, N) in the N-th block in the write data WDATA is written in the memory during a period between the timing t1 and the timing t2. The address thereof is (m, n), assuming the more significant address value is m and the less significant address value is n. In such case, the value of the output OUT13 of the counter 13 becomes the more significant address value m and the output 0 of the counter 12 becomes the less significant address value n and therefore the address is (7d, 0). The data of the next word (D1, N−d) is written in the address (7d, 1). Likewise thereafter, the address of the less significant three bits is incremented one by one for each word and the data of the word D2 to D7 is written in the write addresses determined by the output OUT13 of the counter 13 and the output OUT12 of the counter 12. When the writing of the data of the eight words is completed at the timing t3, the clock WB is applied. Therefore, the count value of the counter 13 is advanced by one and the more significant address m becomes 7d+1 and the data of the respective words in the next (N+1)-th block is in succession written. Meanwhile, in actuality the count value of the counter 13 in such a case reaches the upper limit and the count value returns to 0 and the more significant address m also returns to 0.

Now the operation of the read address designating circuit 102 will be described with reference to the FIG. 5 time chart.

When the clock RB is applied at the timing t1, the counter 15 is reset and the output OUT15 thereof becomes 0. As a result, the less significant read address becomes 0. On the other hand, the counter 13 has a value 7d initially set by the initial setting circuit 19 and the more significant address of the read address designating circuit 101 is set to be delayed by 7d as compared with that of the write address designating circuit 102. Therefore, if and when the more significant address of the write address designating circuit 101 is 7d, the more significant read count value MRCV constituted by the count value of the counter 17 and the count value of the counter 18 is 0. More specifically, the initial setting circuit 19 is for avoiding a conflict between the write addresses and the read addresses of the memory. Without the initial setting circuit 19, both the write addresses and the read addresses would have started from random addresses upon turning on a power supply, whereby a combination of the read data would not have become normal. If once the initial value 7d is set by the initial setting circuit 19, both the write and read addresses make circulation in the memory with a predetermined relation maintained, in the case where the write and read frame frequencies are the same.

When the load clock LD is applied to the input terminal 11e at the timing t4, 0 is loaded in the counter 16. Therefore, the more significant read address m becomes zero and as a result the read address becomes (0, 0). At that time the data (D0, N−7d) which is 7d block before the data (D0, N) is read from the memory 40, as shown in FIG. 3.

When the clock RS is applied at the timing t5, the output OUT15 of the counter 15 becomes 1. At the same time, the counter 16 is advanced by one. This means that the more significant read address m is advanced by d. Therefore, the read address of the memory becomes (d, 1) and the data (D1, N−d−6d)=(D1, N−7d) is read out from the memory 40.

Likewise thereafter, the count values of the counters 15 and 16 are advanced one by one by the clock RS and the data stored in the address designated by both count values is read out, whereby the word arrangement of the (N−7d)-th error correcting block shown by the group 5 in FIG. 1 can be eventually attained.

The interleaving is continuously performed by making the above described operation with the write system and the read system synchronized with each other and with the phase of the clock adjusted such that the data of the word D7 is read after the same is written. In the FIG. 1 example the data of the clock shown in the group 3 is written in the more significant address 7d and then the data of the next block is written in the address of the more significant address 0, whereupon the data (D7, N−7d) of the read address (7d, 7) is read and then the data (D0, N−7d+1) of the leading word of the next error correcting block starts to be read from the address (1, 0), whereby the deinterleaving can be done through circulation of the memory of 8×(7d+1) bits per one bit, where 8 corresponds to the less significant address number and 7d+1 corresponds to the more significant address number. (See FIG. 3.)

In the foregoing a description was made of the address control of the memory on the occasion of the deinterleaving. Although the address control of the memory on the occasion of the interleaving can be readily understood from the foregoing description, a brief description thereof will be made in the following for clarification.

FIG. 6 is a view diagrammatically showing a memory map per one bit in one word on the occasion of the interleaving. Now a difference from the FIG. 3 illustration will be mainly described. The writing of the data is performed by maintaining the row addressing in a predetermined value and by changing the column addressing one by one from 0 to 7. The same is also performed by renewing one by one the row addressing. These are the same as in the case of the deinterleaving. The figure shows a case where the data (D0, N), (D1, N), (D2, N), (D3, N), (D4, N), (D5, N), (D6, N) and (D7, N) are in succession written in the row address 7d and the column addresses 0 to 7. The reading of the data is carried out by changing one by one from 0 to 7 the column addressing each time d is subtracted from the row addressing on the occasion of the writing. The same is carried out by renewing one by one the row addressing. The figure shows a case where the data (D0, N), (D1, N−d), (D2, N−2d), (D3, N−3d), (D4, N−4d), (D5, N−5d), (D6, N−6d) and (D7, N−7d) is in succession read out from the addresses (7d, 0), (6d, 1), (5d, 2), (4d, 3), (3d, 4), (2d, 5), (d, 6) and (0, 7). The delay amount shown in group 2 of FIG. 1 is thus obtained and the interleaving is performed.

In order to achieve the above described interleaving using the address designating apparatus shown in FIG. 2, a down counter may be used in place of the counter 16. Accordingly, the details of the operation of the FIG. 2 address designating apparatus on the occasion of the interleaving will be understood by referring again to FIGS. 4 and 5 and the description in conjunction therewith by taking into consideration the above described alteration.

However, in the case where the interleaving or the deinterleaving as shown in FIG. 1 is to be performed, a minimum indispensable memory capacity per one bit in the word is 28d bits which are the total of the respective delay amounts 0 to 7d, whereas in the case where the FIG. 2 conventional address designating apparatus is to be employed, a memory capacity of 8×(7d+1) bits per one bit in the word was required as described previously, namely a memory capacity as large as two times the minimum indispensable memory capacity was required and uneconomical. Accordingly, it was desired that an addressing method and apparatus of a memory capable of performing the interleaving and the deinterleaving with a memory capacity which is close to the minimum indispensable memory capacity is provided.

SUMMARY OF THE INVENTION

Briefly described, the present invention is directed to an address designating method and apparatus of a memory for designating the addresses of a memory by dividing the same into row addresses and column addresses, which comprises:

(1) on the occasion of the writing of the data in the memory, the steps of adding in succession a predetermined integer value B to the column addressing by maintaining the row addressing in a predetermined positive integer value A, subtracting a predetermined integer value D from the row addressing responsive to reaching of the column addressing to a predetermined positive integer value C, and subtracting in succession a predetermined integer value E from the row addressing while subtracting in succession the above described predetermined integer value B from the column addressing in accord therewith, and (2) on the occasion of the reading of the data from the memory, the steps of adding in succession the above described predetermined integer value E to the row addressing obtained by subtracting a predetermined integer value F from the above described predetermined integer value A while adding in succession the above described predetermined integer value B to the column addressing in accord therewith, subtracting a predetermined integer valued B from the row addressing responsive to reaching of the column addressing to the above described predetermined integer value C, and subtracting in succession the above described predetermined integer value B from the column addressing by maintaining the row addressing in a predetermined positive integer value H.

According to the present invention, the writing of the data in the memory is performed in accordance with the following steps. First the predetermined integer value B is in succession added to the column addressing while the row addressing is maintained in the predetermined positive integer value A. Then upon reaching of the column address to the predetermined positive integer value C, the predetermined integer value D is subtracted from the row addressing. Thereafter each time the predetermined integer value E is subtracted from the row addressing, in accord therewith the above described predetermined integer value B is in succession subtracted from the column addressing. The same as described in the foregoing is performed while the row addressing is renewed one by one. Furthermore, the reading of the data from the memory is performed in accordance with the following steps. First the predetermined value F is subtracted from the above described predetermined integer value A and then the above described predetermined integer value E is in succession added to the thus obtained row addressing while in accord therewith the above described predetermined integer value B is in succession added to the column addressing. Then upon reaching of the column addressing to the above described predetermined integer value C the above described integer value G is subtracted from the row addressing. Thereafter, while the row addressing is maintained in the positive predetermined integer value H, the above described predetermined integer value B is in succession subtracted from the column address. The same as described in the foregoing is performed while the row addressing is renewed one by one. Thus, according to the present invention, the address designating method of a memory is achieved in a so called folded manner and, therefore, in the case where the data is to be interleaved or deinterleaved using a memory, it has been observed that the memory capacity can be halved as compared with a case where a conventional address designating apparatus is employed.

Accordingly a principal object of the present invention is to provide an address designating method or apparatus for a memory capable of performing the interleaving or the deinterleaving with a memory which is close to a minimum indispensable memory capacity, in the case where the data is to be interleaved or deinterleaved using a memory.

A principal advantage of the present invention is that in the case where the data is to be interleaved or deinterleaved using a memory the memory capacity which is approximately a half of a conventional address designating apparatus can be employed. More specifically, it is possible to perform the interleaving or the deinterleaving with a memory capacity close to a minimum indispensable memory capacity.

Another advantage of the present invention resides in economy, a small sized implementation and reduction of power consumption due to approximately a half of the conventional memory capacity.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a time chart for explaining the operation of the gate circuit and the control circuit;

FIG. 10 is a block diagram showing a subtractor;

DESCRIPTION OF THE PREFERRED EMBODIMENTS

Figure 7:
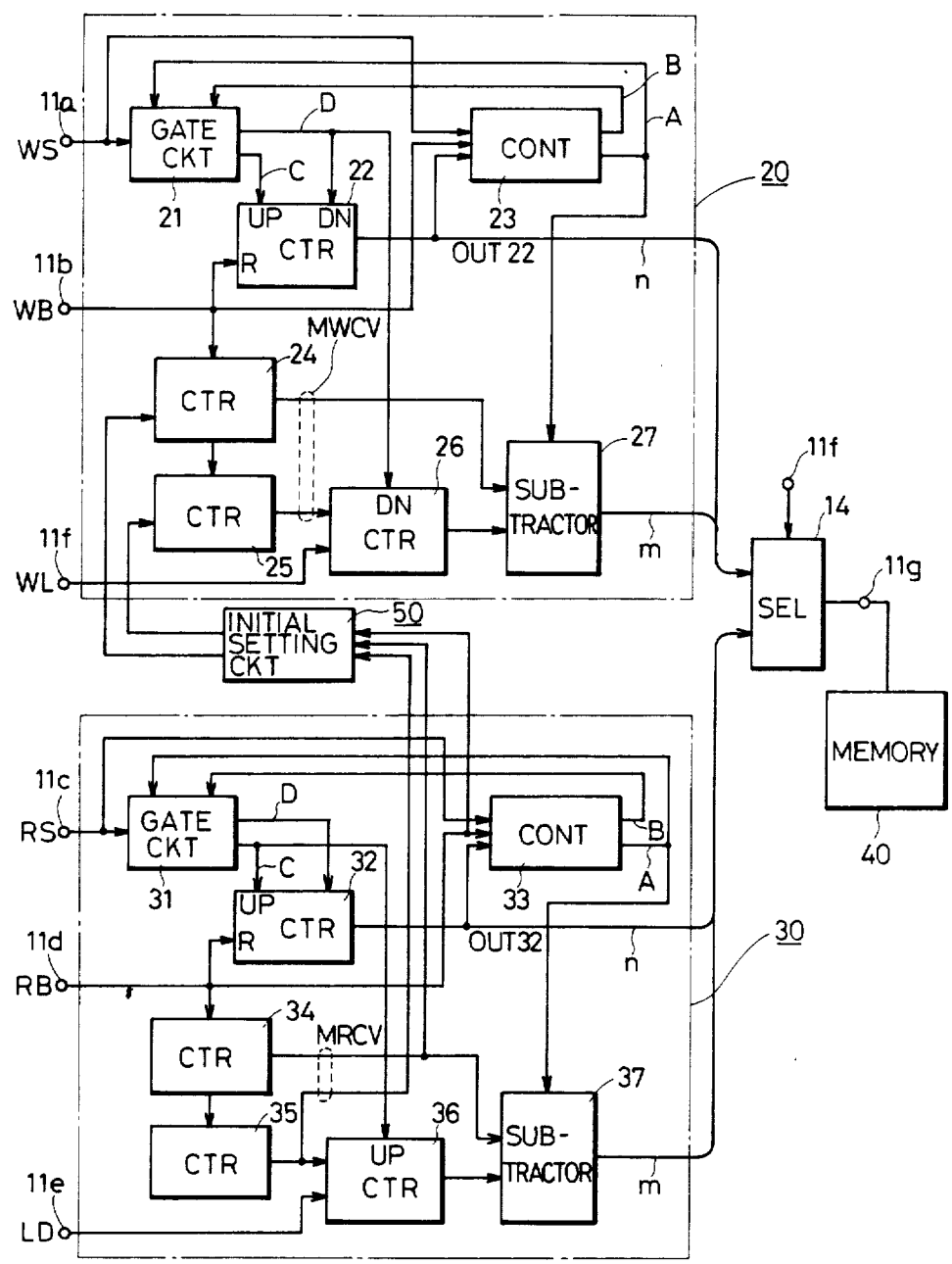
FIG. 7 is a block diagram showing one embodiment of the present invention.

FIG. 7 is a block diagram showing one embodiment of the present invention. Briefly described, the embodiment comprises a write address designating circuit 20 for designating the addresses on the occasion of writing of the data in a memory 40, an initial setting circuit 50 coupled to the above described write address designating circuit 20 for providing an initial read row address, a read address designating circuit 30 coupled to the above described initial setting circuit 50 for designating the addresses on the occasion of reading of the data from the memory 40, and a selector 14 coupled to the write address designating circuit 20 and the read address designating circuit 30 for connecting either of them to the memory 40. The write address designating circuit 20 comprises a first address designating means for adding in succession a predetermined integer value B to the column addressing while maintaining the row addressing in a predetermined positive integer value A, a second address designating means responsive to reaching of the column addressing to a predetermined positive integer value C for subtracting a predetermined integer value D from the row addressing, and a third address designating means for subtracting in succession a predetermined integer value E from the row addressing while subtracting in succession the above described predetermined integer value B from the column addressing in accord therewith. The read address designating means 30 comprises a fourth address designating means for adding in succession the above described predetermined integer value E to the above described initial read row addressing while adding in succession the above described predetermined value B to the column addressing in accord therewith, a fifth address designating means responsive to reaching of the column addressing to the above described predetermined integer value C for subtracting a predetermined integer value G from the row addressing, and a sixth address designating means for subtracting in succession the above described predetermined integer value B from the column addressing while maintaining the row addressing in a predetermined positive integer value H.

Figure 2:
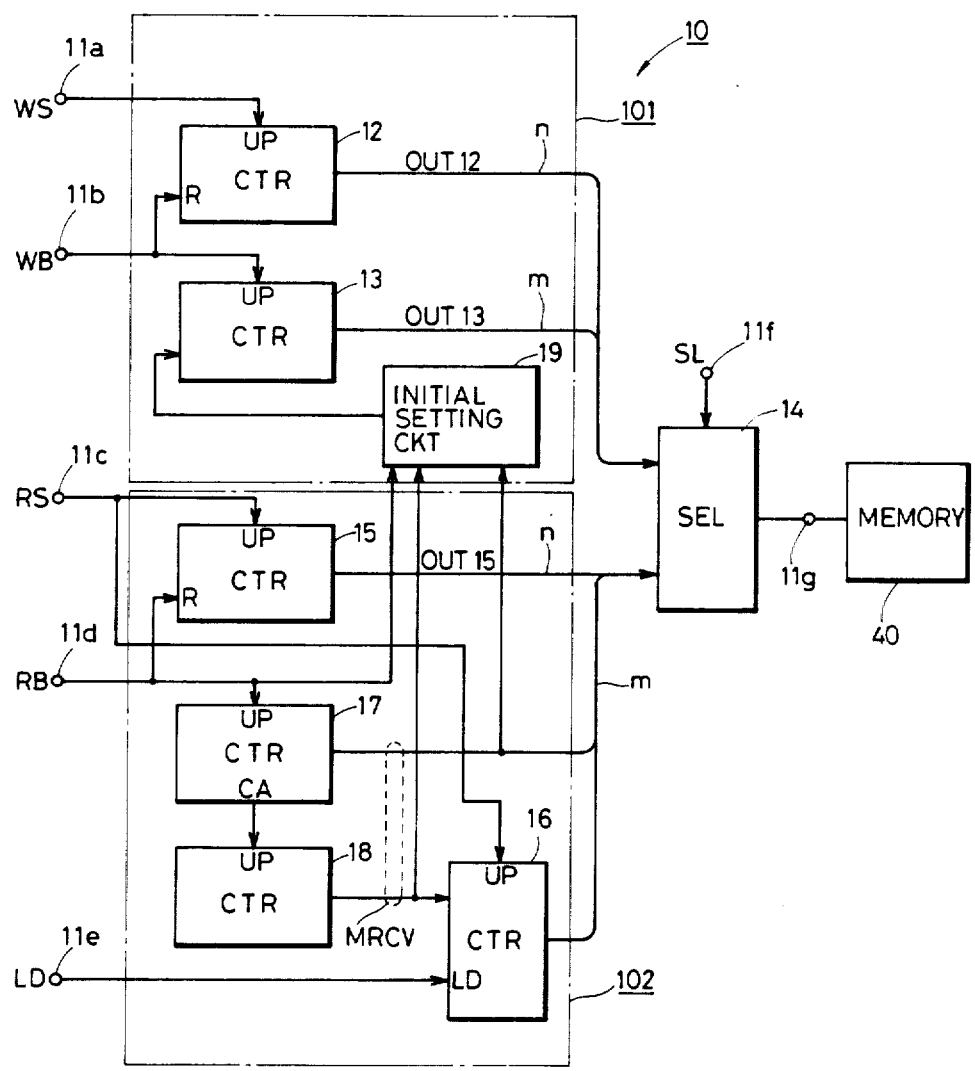
FIG. 2 is a block diagram of a conventional memory address designating apparatus for performing the deinterleaving processing.
Figure 4:
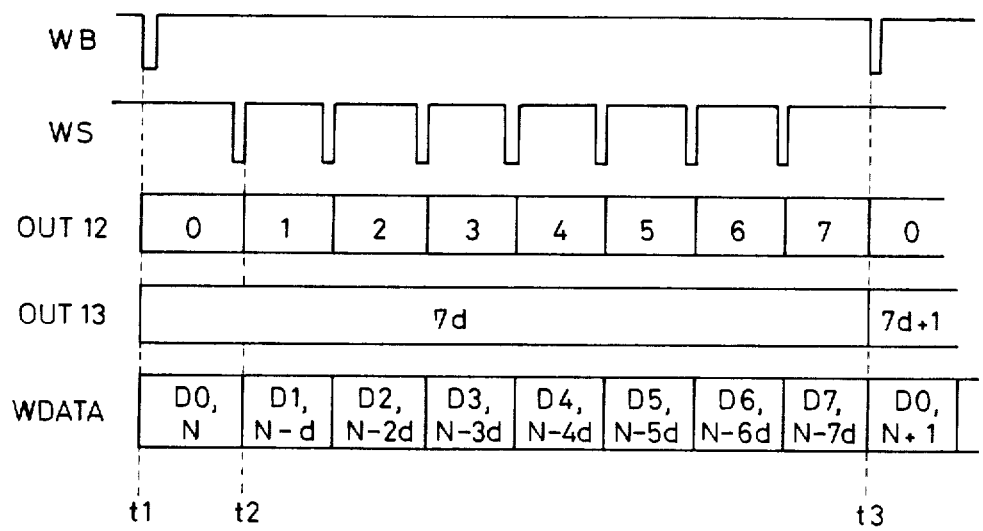
FIG. 4 is a time chart for explaining the operation of the write address designating circuit.
Figure 5:
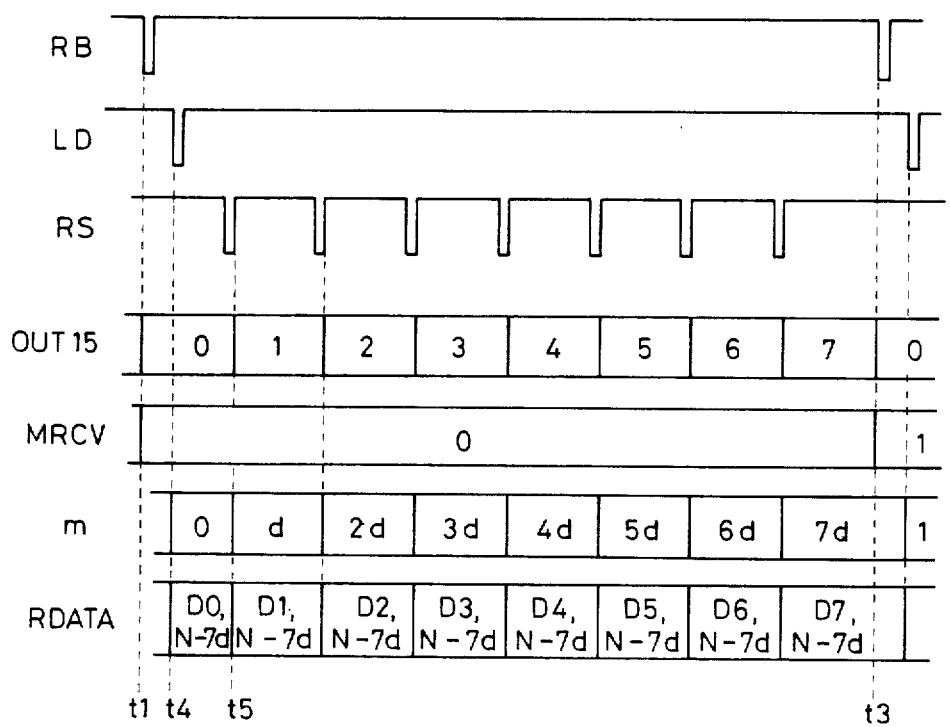
FIG. 5 is a time chart for explaining the operation of the read address designating circuit.
Figure 6:
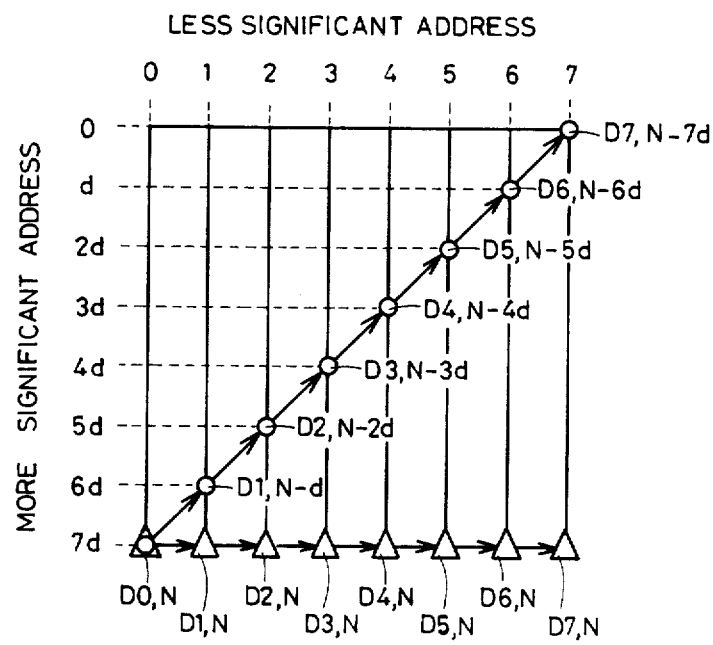
FIG. 6 is a view diagrammatically showing a memory map per one bit in one word on the occasion of performing the interleaving.

Now a detailed structure and operation of the address designating apparatus shown in FIG. 7 will be described. FIG. 7 is similar to FIG. 2 and shows a block diagram for performing the deinterleaving. Meanwhile, the interleaving will be described subsequently.

The write address designating circuit 20 comprises a gate circuit 21, a counter 22, a control circuit 23, counters 24 to 26, and a subtractor 27. The gate circuit 21 is supplied with a clock WS and the outputs A and B from the control circuit 23. The gate circuit 21 comprises two OR gates 211 and 212 to be described subsequently with reference to FIG. 8. The counter 22 comprises an up-down counter having a two-bit output and receives one output C of the gate circuit 21 at an addition input terminal UP and the other output D at a subtraction input terminal DN. The reset terminal R of the counter 22 is supplied with a clock WB. The counter 24 comprises a four-bit counter and is stepped up responsive to the clock WB and undergoes initial setting by the initial setting circuit 50. The counter 25 receives the carry output of the counter 24 and undergoes presetting responsive to the output of the initial setting circuit 50. The counter 26 receives the output D from the gate circuit 21 at a subtraction input terminal DN and is supplied with the output of the counter 25 as a parallel load input. The counter 26 is responsive to each application of the write load clock (hereinafter referred to as the clock WL) obtained through the input terminal 11$f$ to be loaded with the output from the counter 25. The subtractor 27 makes subtraction from the value achieved by the outputs from the counters 24 and 26 of 0 when the output A of the control circuit 23 is the high level and of $4d+1$ when the output A thereof is the low level. The output from the counter 22 is applied to the selector 14 as the write address data of n bits and the output from the subtractor 27 is applied to the selector 14 as the write address data of m bits. Accordingly, the memory 40 has the write address of the less significant two bits designated by the count value of the counter 22 and has the more significant write address designated by the output of the subtractor 27.

The read address designating circuit 30 has the same structure as that of the write address designating circuit 20 and comprises a gate circuit 31, a counter 32, a control circuit 33, counters 34 to 36 and a subtractor 37. The subtractor 37 serves to subtract 0 from the value achieved by the outputs of the counters 34 and 36 in the case where the output A of the control circuit 33 is the logic one and to subtact $3d+1$ in the case where the output A of the control circuit 33 is the logic zero. Since the structure of the remaining portions is the same as that of the read address designating circuit 20, a more detailed description thereof will be omitted.

Before entering into a detailed description of the operation of the write address designating circuit 20 and the read address designating circuit 30, the structure and the operation of each of the gate circuit 21, the control circuit 23, the subtractor 27 and the initial setting circuit 28 will be described.

Figure 8:
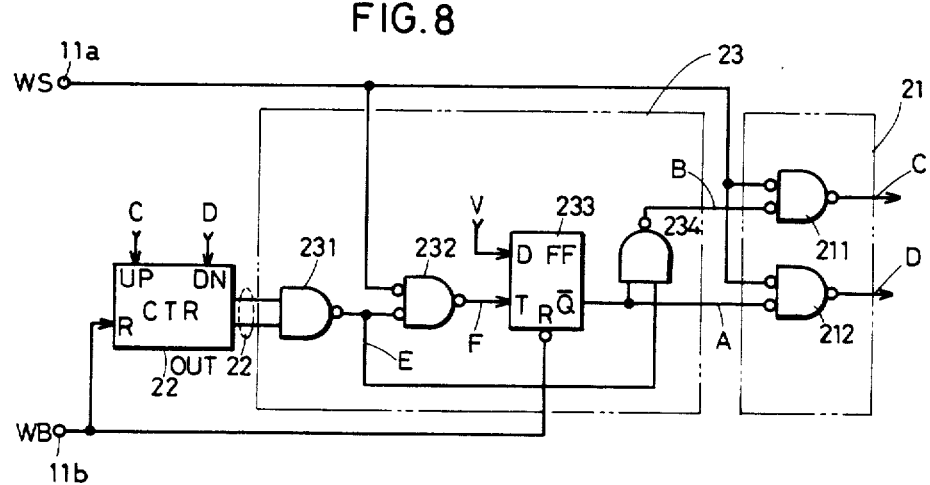
FIG. 8 is a diagram showing the details of the gate circuit and the control circuit shown in FIG. 7.

FIG. 8 is a more detailed block diagram of the gate circuit 21 and the control circuit 23 shown in FIG. 7. First a specific structure of the control circuit 23 will be described. An NAND gate 231 is connected to receive as an input thereto the output OUT22 of the counter 22 and provides the logic zero or the low level output when "3" i.e. "11" in terms of the binary cord is applied. The OR gate 232 receives the output of the NAND gate 231 and the clock WS and provides the output F to the clock input terminal T of the D-type flip-flop 233. The clock WB is applied to the reset terminal R of the D-type flip-flop 233. The input terminal D of the D-type flip-flop 233 is connected to the voltage source V. The inverted output A from the inverted output terminal $\overline{Q}$ of the D-type flip-flop 233 and the output E from the NAND gate 231 are applied to the NAND gate 234.

Now referring to FIGS. 8 and 9, the operation of the gate circuit 21 and the control circuit 23 will be described. FIG. 9 is a time chart for explaining the operation of the gate circuit 21 and the control circuit 23.

When the clock WB becomes the low level at the timing t1, the counter 22 and the D-type flip-flop 233 are reset. Therefore, the output E of the NAND gate 231 and the inverted output A of the D-type flip-flop 233 both become the high level and the output B of the NAND gate 234 becomes the low level. Thereafter the clock WS is applied through the OR gate 211 to the addition input terminal UP of the counter 22.

At the timing t6 the output OUT22 of the counter 22 becomes 3 responsive to the fall of the output C of the OR gate 211 and the output E of the NAND gate 231 becomes the low level.

At the timing t7 the inverted output A of the D-type flip-flop 233 turns from the high level to the low level responsive to the output F of the OR gate 232. Therefore, the output B of the NAND gate 234 assumes the high level during a period from the timing t6 to the timing t3 when the next clock WB changes and the output A of the D-type flip-flop 233 assumes the low level during a time period from the timing t7 to the timing t3. As a result, the OR gate 211 provides the clock WS applied during the period between the timing t1 and the timing t6. The OR gate 212 provides the clock WS applied between the timing t7 and the timing t3. Accordingly, the counter 22 repeats an operation in which the output OUT22 is counted up from 0 to 3 and the count value 3 is maintained for a period of two clocks, whereupon the output OUT22 is counted down to 0.

FIG. 10 is a block diagram of the subtractor 27. The subtractor 27 comprises an adder 271 of four bits, an adder 272 of $m-4$ bits and a complement setter 273. The adder 271 is supplied with the output OUT24 of the counter 24 and the adder 272 is supplied with the output OUT26 of the counter 26. The output OUT27 of the counters 271 and 272 is applied to the selector 14 as address data of m bits. The complement setter 273 serves to set a complement $[4d+1]$ of the value $4d+1$ to be subtracted in the subtractor 27 and provides 0 when the output A of the control circuit 23 is "1" and provides a complement $[4d+1]$ when the output A of the control circuit 23 is "0". The adders 271 and 272 serve to add 0 or the complement $[4d+1]$ to the value achieved by the output OUT24 of the counter 24 and the output OUT26 of the counter 26. However, since the addresses of the memory are circulated, in the case where the result of addition comprises a carry over, the carry over is neglected. Accordingly, the subtractor 27 serves to subtract, from the value achieved by the output OUT24 of the counter 24 and the output OUT26 of the counter 26, 0 when the output A of the control circuit 23 is "1" and 4d+1 when the output A of the control circuit 23 is "0". Meanwhile, the same as the subtractor 27 also applies to the subtractor 33, except that the value to be subtracted is 3d+1.

Figure 11:
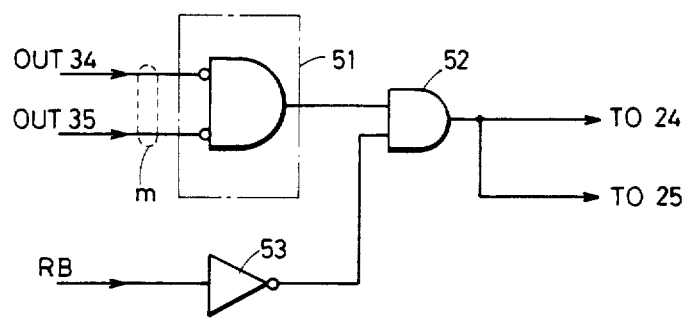
FIG. 11 is a block diagram showing an initial setting circuit.

FIG. 11 is a block diagram of the initial setting circuit 50. The initial setting circuit 50 comprises a zero detecting circuit 51, an AND gate 52 and an inverter 53. The zero detecting circuit 51 comprises an NAND gate having input terminals of m bits, for example. The zero detecting circuit 51 is connected to receive the value of m bits achieved by the output OUT34 of the counter 34 and the output OUT35 of the counter 35. The zero detecting circuit 51 provides to the AND gate 52 "1" when the input thereof is 0. The clock RB (the negative logic) is applied to the inverter 53 and the inverted clock RB is applied to the AND gate 52. Accordingly, the AND gate 52 provides "1", if and when the value achieved by the output OUT34 of the counter 34 and the output OUT35 of the counter 35 is zero and the clock RB is applied. The output "1" from the AND gate 52 is applied to the counters 24 and 25 whereby the value achieved by the output of the counter 24 and the output of the counter 25 is initially set in a forced manner to 7d.

Figure 1:
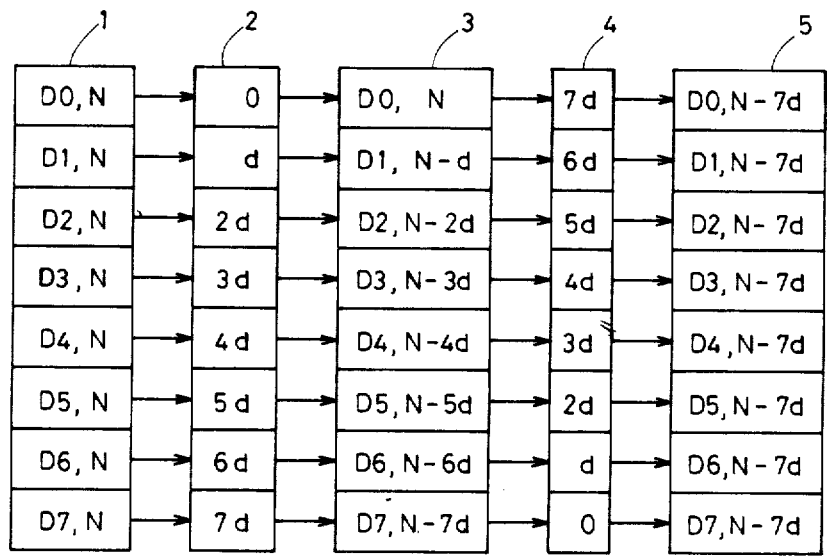
FIG. 1 is a view of a data format for explaining the processing of the interleaving and the deinterleaving which constitute the background of the invention.
Figure 3:
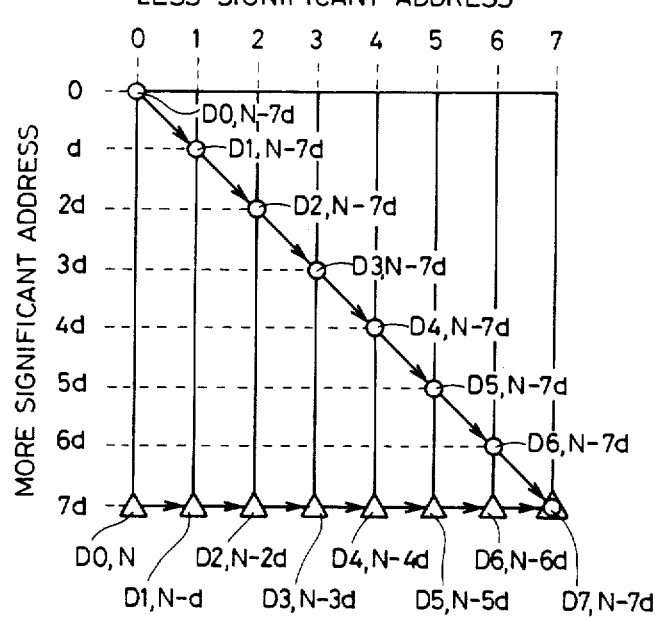
FIG. 3 is a view for diagrammatically showing a memory map per one bit in one word on the occasion of performing the deinterleaving.
Figure 12:
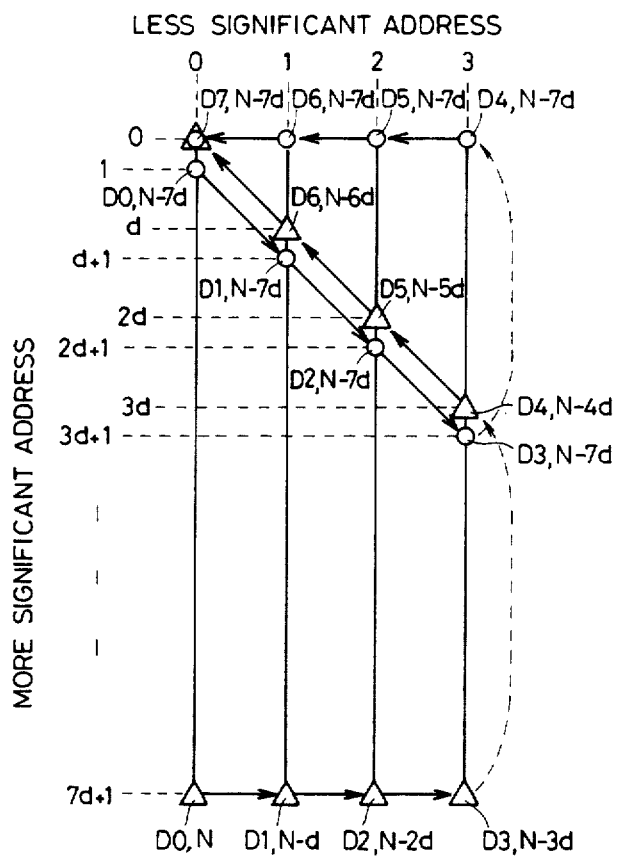
FIG. 12 is a view diagrammatically showing a memory map per one bit in one word on the occasion of performing the deinterleaving.

Before entering into a detailed description of the operation of the address designating circuit shown in FIG. 7, an outline operation thereof will be described with reference to FIG. 12. FIG. 12 is a view diagrammatically showing a memory map per one bit in one word on the occasion of the deinterleaving. The more significant addresses have been selected as the row addresses and the addresses of the less significant two bits have been selected as the column addresses. A major difference from FIG. 3 is that the column addresses are of two-bits. A triangle mark denotes the write data and a circle mark denotes the read data. The writing of the data is performed by the following steps. First the column addressing is changed one by one from 0 to 3 while the row addressing is maintained in a predetermined value, say 7d+1. The figure shows a case where the data (D0, N0), (D1, N−d), (D2, N−2d), and (D3, N−3d) are in succession written in the row address 7d+1 and the column addresses 3 to 0. The upon reaching of the column addressing to 3, the row addressing is decremented by 4d+1. Thereafter the row addressing is decremented in succession by d, while the column addressing is also decremented in succession one by one from 3 to 0 in accord therewith. The figure shows a case where the data (D4, N−4d), (D5, N−5d), (D6, N−6d) and (D7, N−7d) is in succession written in the addresses (3d, 3), (2d, 2), (d, 1), and (0, 0), respectively. The same as described in the foregoing is also carried out while the row addressing is renewed one by one. The reading of the data is performed in accordance with the following steps. First the column addressing is changed one by one from 0 to 3 each time d is added to the row addressing obtained by subtracting 7d from the row addressing on the occasion of the writing. The figure shows a case where the data (D0, N−7d), (D1, N−7d), (D2, N−7d), and (D3, N−7d) is in succession read from the addresses (1, 0), (d+1, 1), (2d+1, 2), and (3d+1, 3). When the column addressing reaches 3, the row addressing is subtracted by 3d+1. Thereafter the column addressing is subtracted one by one from 3 to 0 while the row addressing is maintained in 0. The figure shows a case where the data (D4, N−7d), (D5, N−7d), (D6, N−7d) and (D7, N−7d) is read out in succession from the addresses (0, 3), (0,2), (0, 1), and (0, 0). The same as the foregoing is carried out while the row addressing is renewed one by one. Thus the delay amount shown in the group 4 in FIG. 1 is attained and the deinterleaving is performed.

Figure 13:
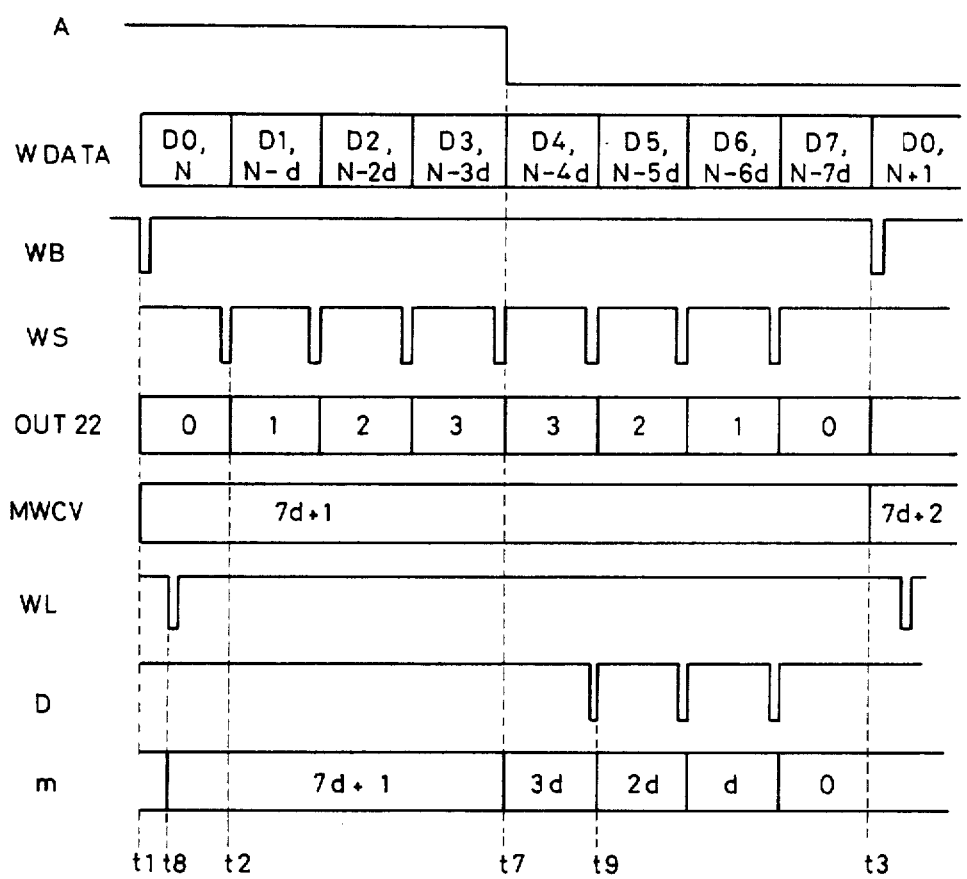
FIG. 13 is a time chart for explaining the operation of the write address designating circuit.
Figure 14:
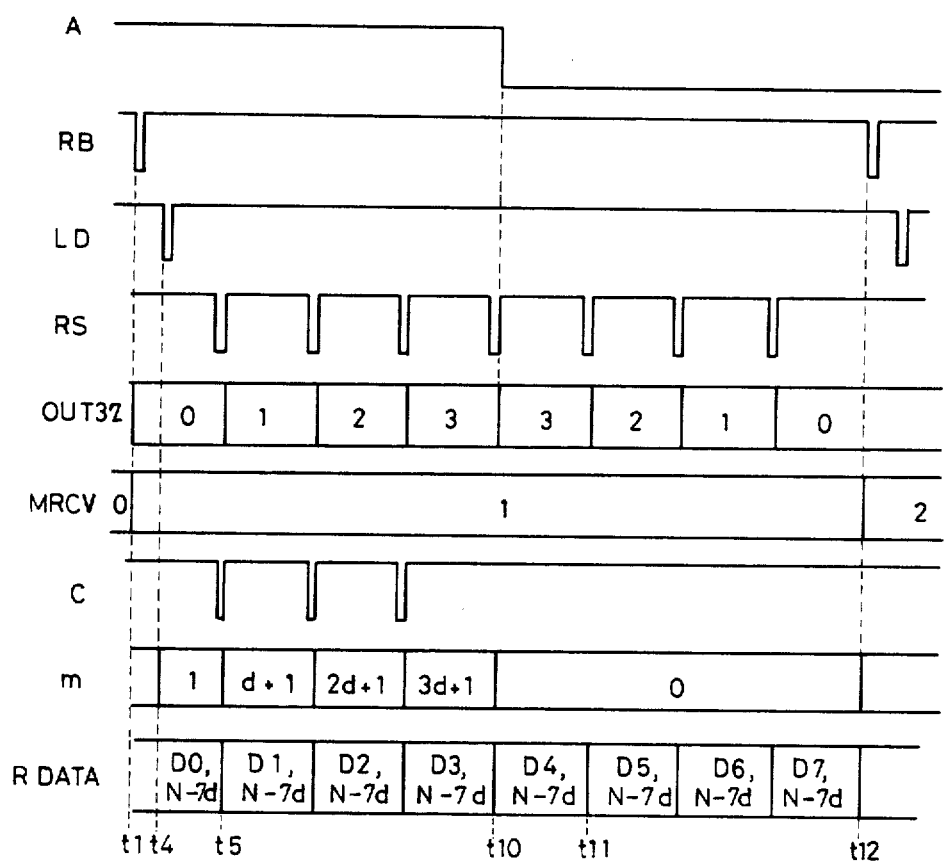
FIG. 14 is a time chart for explaining the operation of the read address designating circuit.
Figure 15:
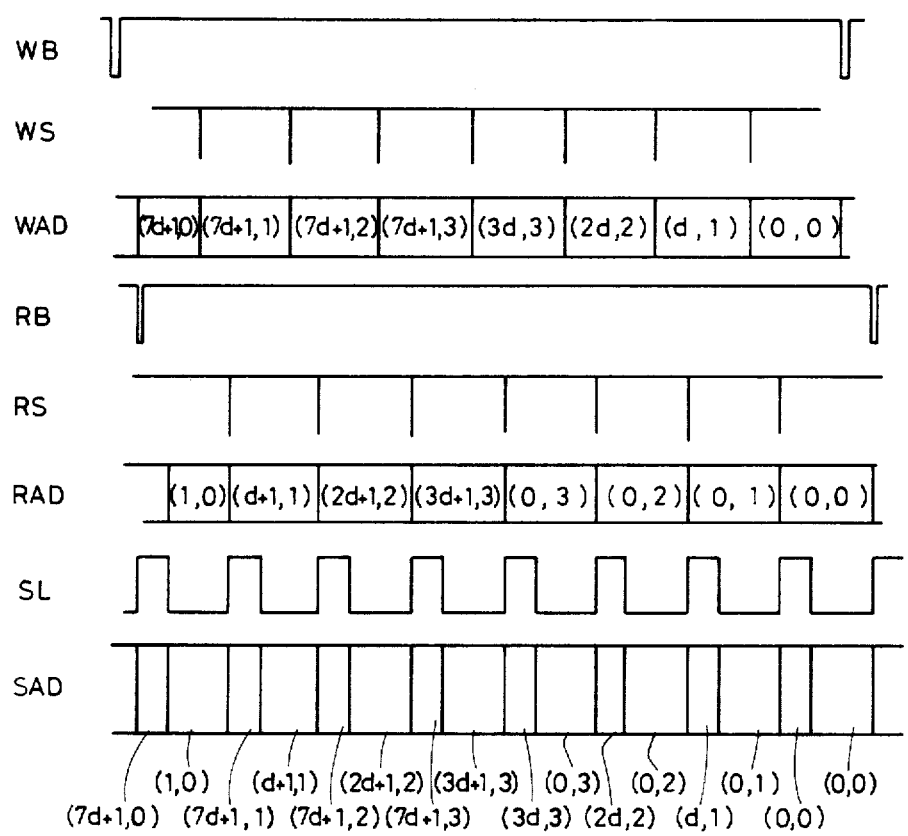
FIG. 15 is a time chart for explaining the operation of a selector.

Now the operation of the address designating apparatus shown in FIG. 7 will be described in detail with reference to FIGS. 13 to 15. FIG. 13 is a time chart for explaining the operation of the write address designating circuit 20. FIG. 14 is a time chart for explaining the operation of the read address designating circuit 30. FIG. 15 is a time chart for explaining the operation of the selector 14.

First the operation of the write address designating circuit 20 will be described in conjunction with the FIG. 13 time chart.

When the clock WB becomes the low level at the timing t1, the output OUT22 of the counter 22 becomes 0. At the same time the more significant count value MWCV for designating the more significant address m achieved by the outputs of the counters 24 and 25 is counted up by 1. As the result, the more significant count value MWCV changes from the value assumed immediately before, i.e. 7d, to 7d+1.

When the clock WL of the low level is applied at the timing t8, the counter 26 is loaded with the value of the counter 25. At that time the output A of the control circuit 23 is "1" (See FIG. 9) and the subtrahend of the subtractor 27 is 0 and therefore the write address becomes (7d+1, 0). Therefore, the data of the word (D0, N) in the N-th block of the write data WDATA is written in the address (7d+1, 0) during a period of the timing t8 and the timing t2.

At the timing t2 the count value in the counter 22 becomes 1 at the rise of the clock WS. Therefore, the data of the next word (D1, N−d) is written in the address (7d+1, 1). Likewise thereafter the count value of the counter 22 is stepped up one by one each time the clock WS is applied and the address of the less significant two-bits changes.

At the timing t7 the output OUT22 of the counter 22 becomes 3. Then, as described in conjunction with FIG. 9, the output A of the control circuit 23 becomes "0" and the subtrahend of the subtractor 27 becomes 4d+1 and therefore the address changes to (3d, 3). Accordingly, the data of the word (D4, N−4d) is written in the address (3d, 3).

At the timing t9 the clock WS becomes the output D of the gate circuit 21 and is applied to the subtraction input terminal DN of the counters 22 and 26. Therefore, when the clock WS turns from the low level to the high level, the output OUT22 of the counter 22 is counted down by 1 and, when the less significant address is counted down by 1, the count value of the counter 26 is also counted down by 1, i.e. the more significant address m is counted down by d. As the result, the data of the word (D5, N−5d) is written in the address (2d, 2). Likewise thereafter the data of the word (D6, N−6d) is in succession written in the address (d, 1) and the data of the word (D7, N−7d) is written in the address (0, 0). Thus, the writing of the data of one block is completed during a period between the timing t1 and the timing t3. After the timing t3 the more significant count value MWCV is counted up by 1 i.e. becomes 7d+2 in the same manner as the above described operation and the writing of the data of the respective words of the next block is performed. Meanwhile, in actuality the value of the counters 24 and 25 reaches the upper limit in such a case and the more significant count value MWCV turns to 0.

Now the operation of the read address designating circuit 30 will be mainly described in conjunction with the FIG. 14 time chart.

When the clock RB becomes the low level at the timing t1, the counter 32 is reset and the output OUT32 becomes 0. At the same time the more significant read count value MRCV achieved by the outputs of the counters 34 and 35 is counted up by 1 and the value changes from the immediately before value 0 to 1. In comparing the more significant addresses m of the read address designating circuit 20 and the write address designating circuit 30, when the more significant read count value MRCV is 0, the more significant write count value MWCV has been set to 7d by the initial setting circuit 50 (see the illustration in FIG. 11 and the description in conjunction therewith). Since the clock WB and the clock RB have been selected to be of the same frequency, when the more significant write count value MWCV is 7d+1, the more significant read count value MRCV becomes 1. More specifically, the initial setting circuit 50 aims to avoid a conflict between the write addresses and the read addresses of the memory. Without the initial setting circuit 50, both of the write and read addresses start from random addresses upon turning on of the power supply and a combination of the read data does not become normal. When an initial value 7d is once set by the initial setting circuit 50, both of the write and read addresses make circulation of the memory with a predetermined relation maintained, in the case where the write and read frame frequencies are the same.

When the load clock LD is applied to the counter 36 at the timing t4, the counter 36 is loaded with 0 of the output from the counter 35. Since the output A of the control circuit 33 is "1" and the subtrahend of the subtractor 37 is 0 at that time, the designated address becomes (1, 0). The data when the address is (1, 0) is data of the block earlier by 7d than the data (D0, N) of the address (7d+1, 0) and therefore the output data DATA from the memory 40 becomes the data of the word (D0, N−7d).

At the timing t5 the output OUT32 of the counter 32 becomes 1 responsive to the output C of the gate circuit 31 and the count value of the counter 36 is counted up by 1, i.e. the more significant address m is counted up by d. The address as designated at that time becomes (d+1, 1). Accordingly, the data read from the memory 40 is the data of the word (D1, N−d−6d)=(D1, N−7d). Such operation is repeated until the data of the word (D3, N−7d) is read out. After the timing t10, the subtrahend of the subtractor 37 becomes 3d+1 responsive to the output A of the control circuit 33 becoming "0". Therefore, the address becomes (0, 3) and the data of the word (D4, N−7d) is read from the memory.

At the timing t11 only the counter 32 is counted down by only 1 and the address becomes (0, 2). The data of the word (D5, N−7d) designated by the address (0, 2) is read out from the memory. Likewise thereafter, each time the clock RS is applied, the value in the counter 32 is counted down and the data of the word (D6, N−7d) and the data of the word (D7, N−7d) are in succession read out.

At the timing t12 the reading of 8 words of the (N−7d)-th error correcting bclock is completed.

FIG. 15 is a time chart for explaining the operation of the selector 15. The selector 15 is responsive to the select signal SL applied to the input terminal 11f to selectively provide to the memory 40 either the write addresses WAD or the read addresses RAD. For example, in the case where the select signal SL is the high level, the write addresses WAD are selected and are applied through the output terminal 11g to the memory 40 as the designating addresses SAD of the memory. On the other hand, if and when the select signal SL is the low level, the read addresses RAD are selected and are applied through the output terminal 11g to the memory 40 as the designating addresses SAD of the memory. Since the designating addresses SAD of the memory in the case where the write addresses WAD are selected and in the case where the read addresses RAD are selected will be readily understood with reference to FIG. 15, a detailed description thereof will be omitted. By selecting the clock WB and the clock RB to be of the same period, by selecting the clock WS and the clock RS to be of the same period, and by selecting the write addresses WAD or the read addresses RAD in response to the select signal, as shown in FIG. 15, the deinterleaving can be made continually.

Meanwhile, in the case where the deinterleaving is to be carried out, the address designating method of the memory is not limited to the foregoing examples. Therefore, other address designating method will be briefly described in the following.

Figure 16:
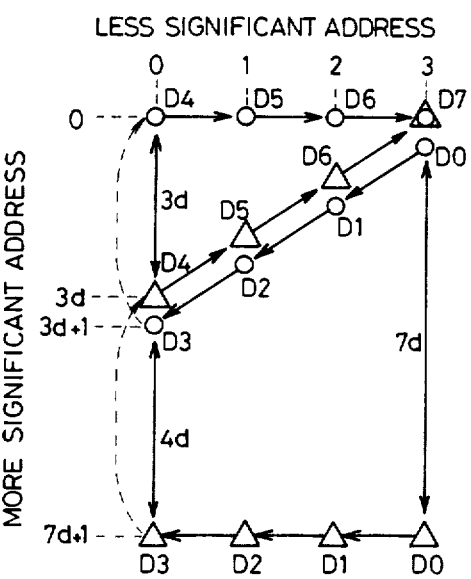
FIGS. 16 to 18 are views diagrammatically showing memory maps in the case where other address designating methods are employed on the occasion of performing the deinterleaving.
Figure 17:
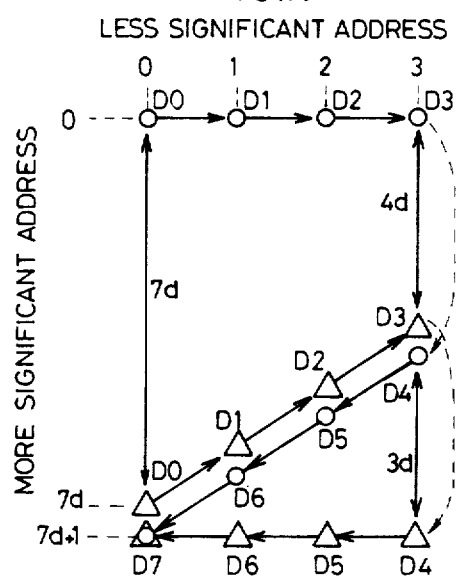
Figure 18:
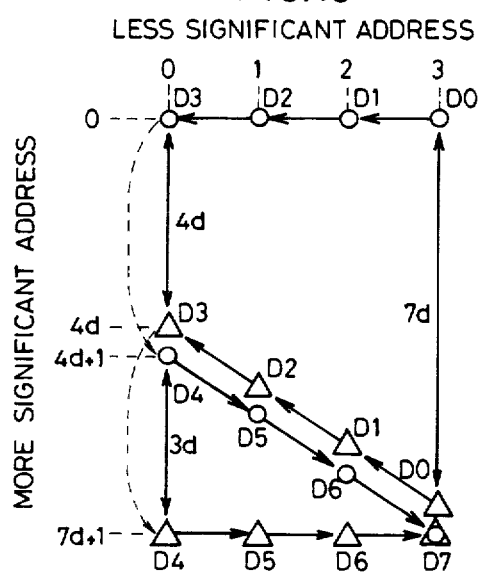

FIGS. 16 to 18 are views diagrammatically showing memory maps in the case where other address designating methods are employed in carrying out the deinterleaving. A triangle mark denotes the write data and a circle mark denotes the read data.

In the case of the FIG. 16 example, the writing of the data is performed in accordance with the following steps. First the column addressing is changed one by one from 3 to 0 while the row address is kept in a predetermined value, say 7d+1. Then upon reaching of the column address to 0, the row addressing is decremented by 4d+1. Thereafter the row addressing is decremented in succession by d, while the column addressing is incremented one by one from 0 to 3 in accord therewith. The same as the foregoing is performed while the row addressing is renewed one by one. The reading of the data is performed in accordance with the following steps. First d is added to the row addressing obtained by subtracting 7d from the row addressing on the occasion of the writing, while the column addressing is changed one by one from 3 to 0 in accord therewith. Then upon reaching of the column address to 0, the row addressing is decremented by 3d+1. Thereafter the column addressing is incremented one by one from 0 to 3 while the row addressing is maintained in 0. The same as the foregoing is carried out while the row addressing is renewed one by one. The above described address designating method may be used in the FIG. 7 address designating apparatus by making minor modifications set forth in the following.

(1) The addition input terminal UP and the subtraction input terminal DN are exchanged in the counters 22 and 32.

(2) The reset terminals R of the counters 22 and 32 are not required and both counters are set to 3 responsive to the clocks WB and RB.

(3) An OR gate is utilized for detecting 0 in place of an NAND gate for detecting 3 included in the control circuits 23 and 33.

In the case of the FIG. 17 example, the writing of the data is performed in accordance with the following steps. First the row address is decremented in succession by d from 7d while the column address is incremented one by one from 0 to 3 in accord therewith. Then upon reaching of the column address to 3, the row addressing is incremented by 3d+1. Thereafter the column addressing is changed one by one from 3 to 0 while the row addressing is maintained in 7d+1. The same as the foregoing is performed while the row addressing is renewed one by one. The reading of the data is performed in accordance with the following steps. First the column addressing is changed one by one from 0 to 3 while the row addressing is kept in 0. Then upon reaching of the column addressing to 3, the row addressing is incremented by 4d+1. Thereafter the row addressing is incremented in succession by d, while the column addressing is decremented one by one from 3 to 0 in accord therewith. The same as the foregoing is performed while the row addressing is renewed one by one. In order to achieve the above described address designating method by using the address designating apparatus shown in FIG. 7, the following minor modifications may be employed.

(4) The output C of the gate circuit 21 is applied to the subtraction input terminal DN of the counter 26.

(5) The output D of the gate circuit 31 is applied to the addition input terminal UP of the counter 36.

In the case of the FIG. 18 example, the writing of the data is performed in accordance with the following steps. First the row addressing is decremented in succession by d from 7d, while the column addressing is decremented one by one from 3 to 0 in accord therewith. Then upon reaching of the column address to 0, the row addressing is incremented by 3d+1. Thereafter the column addressing is changed one by one from 0 to 3 while the row addressing is kept in 7d+1. The same as the foregoing is performed as the row addressing is renewed one by one. The reading of the data is performed in accordance with the following steps. First the column addressing is changed one by one from 3 to 0 while the row addressing is kept in 0. Then upon reaching of the column addressing to 0, the row addressing is incremented by 4d+1. Thereafter the row addressing is incremented in succession by d, while the column addressing is incremented one by one from 0 to 3 in accord therewith. The same as the foregoing is performed as the row addressing is renewed one by one. The above described address designating method can be made by using the FIG. 7 address designating apparatus, and by making the above described modifications (1) to (5).

In the foregoing the address control of the memory on the occasion of performing the deinterleaving was described in detail. Although the address control of the memory on the occasion of the interleaving will be also readily understood from the foregoing description, such will be described briefly in the following for the purpose of clarification. FIGS. 19 to 22 are views diagrammatically showing the memory maps in the case where the interleaving is to be performed. A triangle mark denotes the write data and a circle mark denotes the read data.

Figure 19:
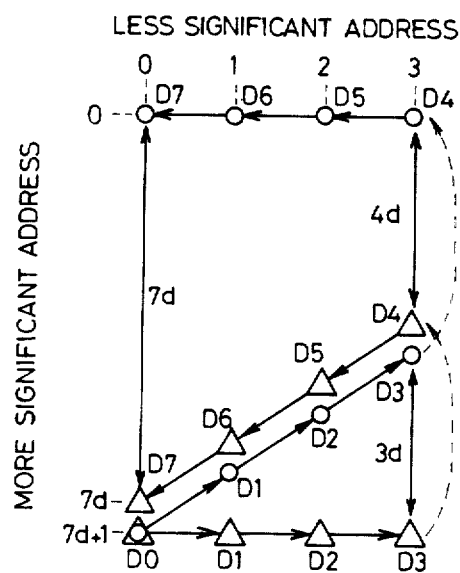
FIGS. 19 to 22 are views for diagrammatically showing memory maps on the occasion of performing the interleaving.

In the case of the FIG. 19 example, the writing of the data will be performed in accordance with the following steps. First the column addressing is changed one by one from 0 to 3 while the row addressing is kept in d+1. Then upon reaching of the column addressing to 3, the row addressing is decremented by 3d+1. Thereafter the row addressing is incremented in succession by d, while the column addressing is decremented one by one from 3 to 0 in accord therewith. The same as the foregoing is performed as the row addressing is renewed one by one. The reading of the data is performed in accordance with the following steps. First each time subtraction is made in succession of d from the row addressing 7d+1 on the occasion of the writing, the column addressing is changed one by one from 0 to 3 in accord therewith. Then upon reaching of the column addressing to 3, the row addressing is decremented by 4d+1. Thereafter the column addressing is decremented one by one from 3 to 0, while the row addressing is kept in 0. The same as the foregoing is performed as the row addressing is renewed one by one. The delay amount shown in the group 2 in FIG. 1 is thus attained and the interleaving is performed. The foregoing address designating methods can be performed using the FIG. 7 address designating apparatus by making minor modifications set forth in the following. The details of the operation should be again referred to the foregoing description taking into consideration such modifications.

(1) The subtraction input terminal DN of the counter 26 is changed to the addition input terminal UP.

(2) The addition input terminal UP of the counter 32 is changed to the subtraction input terminal DN.

Figure 20:
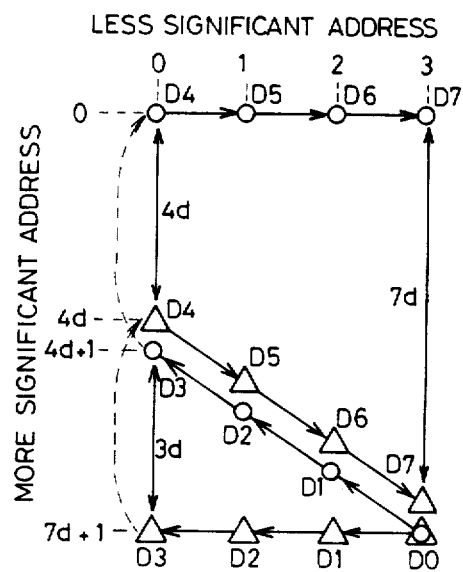

In the case of the FIG. 20 example, the writing of the data is performed in accordance with the following steps. First the column addressing is changed one by one from 3 to 0 while the row addressing is maintained in 7d+1. Then upon reaching of the column addressing to 0, the row addressing is decremented by 3d+1. Thereafter the row addressing is incremented in succession by d, while the column addressing is incremented one by one from 0 to 3 in accord therewith. The same as the foregoing is performed as the row addressing is renewed one by one. The reading of the data is performed in accordance with the following steps. First each time subtraction is made in succession by d from the row addressing 7d+1 on the occasion of the writing, the column addressing is also changed one by one from 3 to 0 in accord therewith. Then upon reaching of the column addressing to 0, subtraction is made of the row addressing by 4d+1. Thereafter the column addressing is incremented one by one from 0 to 3 while row addressing is kept in 0. The same as the foregoing is performed as the row addressing is renewed one by one. The above described address designating method can be performed using the FIG. 7 address designating apparatus by making minor modifications set forth in the following.

(3) The above described modifications (1) and (2) and the above described modifications (1) to (3) in the case of the deinterleaving.

Figure 21:
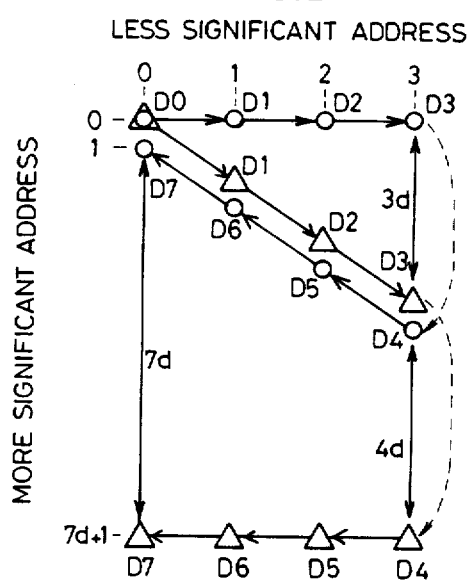

In the case of the FIG. 21 example, the writing of the data is performed in accordance with the following steps. First the row addressing is incremented in succession by d from 0, while the column addressing is incremented one by one from 0 to 3 in accord therewith. Then upon reaching of the column addressing to 3, 4d+1 is added to the row addressing. Thereafter the column addressing is changed one by one from 3 to 0 while the row addressing is maintained in 7d+1. The same as the foregoing is performed as the row addressing is renewed one by one. The reading of the data is performed in accordance with the following steps. First the column addressing is changed one by one from 0 to 3 while the row addressing is maintained 0. Then upon reaching of the column addressing to 3, 3d+1 is added to the row addressing. Thereafter the row addressing is decremented in succession by d, while the column addressing is decremented one by one from 3 to 0 in accord therewith. The same as the foregoing is performed as the row addressing is renewed one by one. The above described address designating method may be performed using the FIG. 7 address designating apparatus, by making minor modifications set forth in the following.

(4) The above described modifications (1) and (2) and the modifications (4) and (5) in the case of the deinterleaving.

Figure 22:
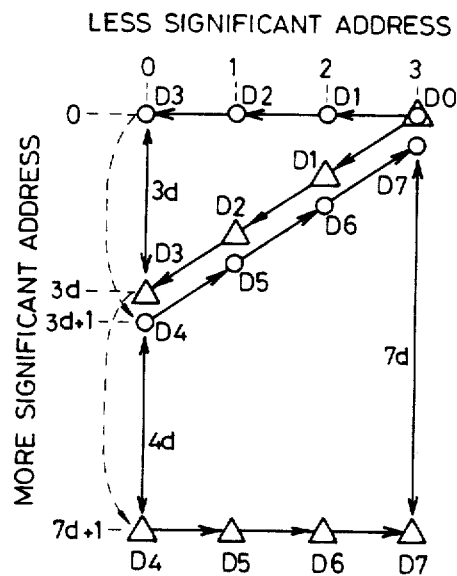

In the case of the FIG. 22 example, the writing of the data is performed in accordance with the following steps. First the row addressing is incremented in succession by d from 0 while the column addressing is decremented one by one from 3 to 0 in accord therewith. Then upon reaching of the column addressing to 0, $4d+1$ is added to the row addressing. Thereafter the column addressing is changed one by one from 0 to 3 while the row addressing is maintained in $7d+1$. The same as the foregoing is performed as the row addressing is renewed one by one. The reading of the data is performed in accordance with the following steps. First the column addressing is changed one by one from 3 to 0 while the row addressing is kept in 0. Then upon reaching of the row addressing to 0, $3d+1$ is added to the row addressing. Thereafter the row addressing is decremented in succession by d, while the column addressing is incremented one by one from 0 to 3 in accord therewith. The same as the foregoing is performed as the row addressing is renewed one by one. The above described address designating method may be performed using the FIG. 7 address designating apparatus by making minor modifications set forth in the following.

(5) The above described modifications (3) and (4).

Finally, as is clear from a comparison of FIGS. 3 and 12, for example, the present invention makes it possible to perform the interleaveing or the deinterleaving with a memory capacity as small as approximately a half of that in the case where a conventional address designating apparatus is employed. More specifically, in the case where a conventional address designating apparatus is employed, a memory capacity of $8 \times (7d+1)$ bits per one bit in the word was required, as described previously. However, according to the present invention, a memory capacity of $4 \times (7d+2)$ bits per one bit in the word is sufficient (where 4 corresponds to the less significant address number and $7d+2$ corresponds to the more significant address number: see FIG. 12). In the case where the interleaving or the deinterleaving is to be performed, the memory capacity indispensably required per one bit in the word is 28d bits which is total of the respective delay amounts 0 to 7d. Therefore, the present invention makes it possible to perform the interleaving and the deinterleaving with a memory capacity which is close to an indispensably required memory capacity.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of designating addresses of a memory by dividing the addresses of the memory into row addresses of row addressing and column addresses of column addressing, said method comprising the steps of, on the occasion of the writing of the data in said memory, adding a predetermined integer value B in succession to said column addressing by maintaining said row addressing in a predetermined positive integer value A, subtracting a predetermined integer value D from said row addressing responsive to reaching of said column addressing to a predetermined positive integer value C, and subtracting in succession a predetermined integer value B from said row addressing while subtracting said predetermined integer value B in succession from said column addressing in accord therewith, and on the occasion of the reading of the data from said memory, adding said predetermined integer value E in succession to said row addressing obtained by subtracting a predetermined integer value F from said predetermined integer value A, while adding said predetermined integer value B in succession to said column addressing in accord therewith, subtracting a predetermined integer value G from said row addressing responsive to reaching of said column addressing to said predetermined integer value C, and subtracting said predetermined integer value B in succession from said column addressing by maintaining said row addressing in a predetermined positive integer value H.

2. An address designating method of a memory in accordance with claim 1, wherein
said predetermined integer values B, D, E, F and G are each a positive value.

3. An address designating method of a memory in accordance with claim 1, wherein
said predetermined integer values D, E, F and G are each a positive value, and
said predetermined integer value B is a negative value.

4. An address designating method of a memory in accordance with claim 1, wherein
said predetermined integer values E and F are each a positive value, and
said predetermined integer values B, D and G are each a negative value.

5. An address designating method of a memory in accordance with claim 1, wherein
said predetermined integer values B, E and F are each a positive value, and
said predetermined integer values D and G are each a negative value.

6. An address designating method of a memory in accordance with claim 1, wherein
said predetermined integer values B, D and G are each a positive value,
said predetermined integer value E is a negative value, and
said predetermined integer value F is zero.

7. An address designating method of a memory in accordance with claim 1, wherein
said predetermined integer values D and G are each a positive value, said predetermined integer values B and E are each a negative value, and said predetermined integer value F is zero.

8. An address designating method of a memory in accordance with claim 1, wherein said predetermined integer value F is a positive value, and said predetermined integer values B, D, E and G are each a negative value.

9. An address designating method of a memory in accordance with claim 1, wherein said predetermined integer values B and F are each a positive value, and said predetermined integer values D, E and G are each a negative value.

10. An apparatus for designating addresses of a memory having row addresses of row addressing and column addresses of column addressing, comprising:

write address designating means (20) for designating the addresses on the occasion of the writing of the data in said memory, said write address designating means (20) comprising first address designating means (21 to 23) for adding in succession a predetermined integer value B to said column addressing by maintaining said row addressing in a predetermined integer value A, second address designating means (27) responsive to reaching of said column addressing to a predetermined positive integer value C for subtracting a predetermined integer value D from said row addressing, and third address designating means (21 to 26) for subtracting in succession a predetermined integer value E from said row addressing while subtracting in succession said predetermined integer value B from said column addressing in accord therewith, initial setting means (50) coupled to said write address designating means (20) for subtracting a predetermined integer value F from said predetermined integer value A, thereby to provide an initial read row address, read address designating means (30) coupled to said initial setting means (50) for designating the addresses on the occasion of reading the data from said memory, said read address designating means (30) comprising fourth address designating means (31 to 36) for adding in succession said predetermined integer value E to said initial read row address while adding in succession said predetermined value B to said column addressing in accord wherewith, fifth address designating means (37) responsive to reaching of said column addressing to said predetermined integer value C for subtracting a predetermined integer value G from said row addressing, and sixth address designating means (31 to 33) for subtracting in succession said predetermined integer value B from said column addressing while maintaining said row addressing in a predetermined integer value H, and selector means (14) coupled to said write address designating means (20) and said read address designating means (30) for selecting either of said write address designating means (20) and said read address designating means (30).

11. An address designating apparatus of a memory in accordance with claim 10, wherein said predetermined integer values B, D, E, F and G are each a positive value.

12. An address designating apparatus of a memory in accordance with claim 10, wherein said predetermined integer values D, E, F, and G are each a positive value, and said predetermined integer value B is a negative value.

13. An address designating apparatus of a memory in accordance with claim 10, wherein said predetermined integer values E and F are each a positive value, and said predetermined integer value B, D and G are each a negative value.

14. An address designating apparatus of a memory in accordance with claim 10, wherein said predetermined integer values B, E and F are each a positive value, and said predetermined integer values D and G are each a negative value.

15. An address designating apparatus in accordance with claim 10, wherein said predetermined integer values B, D, and G are each a positive value, said predetermined integer value E is a negative value, and said predetermined integer value F is zero.

16. An address designating apparatus in accordance with claim 10, wherein said predetermined integer values D and G are each a positive value, said predetermined integer value B and E are each a negative value, and said predetermined integer value F is zero.

17. An address designating apparatus of a memory in accordance with claim 10, wherein said predetermined integer value F is a positive value, and said predetermined integer values B, D, E and G are each a negative value.

18. An address designating apparatus in accordance with claim 10, wherein said predetermined integer values B and F are each a positive value, and said predetermined integer values D, E and G are each a negative value.

* * * * *

UNITED STATES PATENT AND TRADEMARK OFFICE
CERTIFICATE OF CORRECTION

PATENT NO. : 4,516,219
DATED : MAY 7, 1985
INVENTOR(S) : Masayuki ISHIDA

It is certified that error appears in the above-identified patent and that said Letters Patent is hereby corrected as shown below:

Page 1, of the Patent, under "Foreign Application Priority Date", insert:

```
Dec. 18, 1981 [JP]  Japan ............56-205766
Jun. 21, 1982 [JP]  Japan ............57-108207
```

Signed and Sealed this

Twentieth Day of August 1985

[SEAL]

Attest:

DONALD J. QUIGG

*Attesting Officer*     *Acting Commissioner of Patents and Trademarks*